Nov. 9, 1948.  F. B. MARTIN, JR  2,453,635
EMERGENCY HUB ADAPTER
Filed June 17, 1946
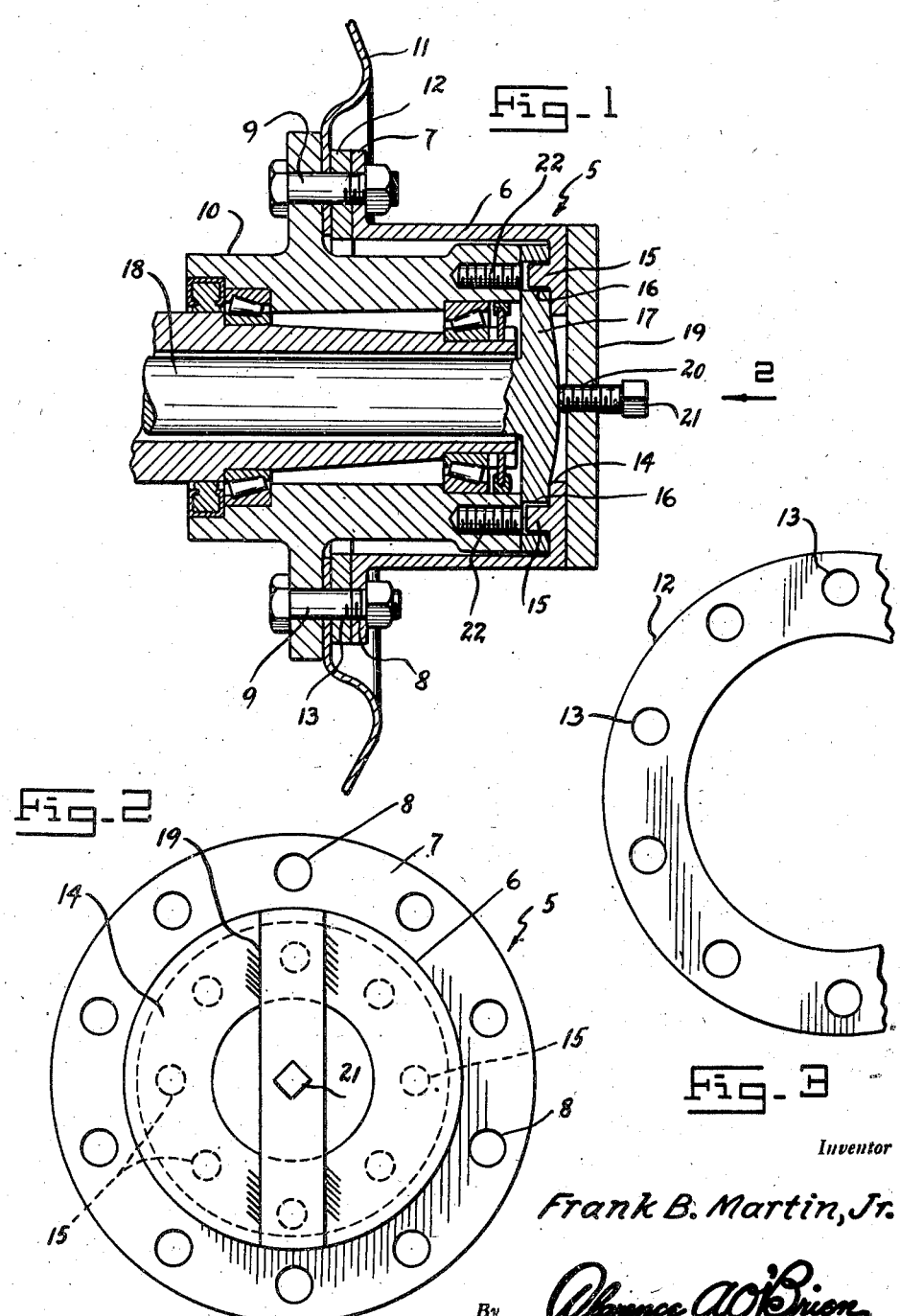
Inventor
Frank B. Martin, Jr.
By Clarence A. O'Brien
and Harvey B. Jacobson
Attorneys Patented Nov. 9, 1948

2,453,635

UNITED STATES PATENT OFFICE 2,453,635

EMERGENCY HUB ADAPTER

Frank B. Martin, Jr., Pensacola, Fla.

Application June 17, 1946, Serial No. 677,325

1 Claim. (Cl. 301—105)

This invention relates to new and useful improvements and structural refinements in emergency hub adapters, more specifically, in emergency adapters for hubs and wheel axles on trucks, buses and similar vehicles.

The principal object of the invention is to provide an adapter which may be applied to the hub under emergency conditions, such as may result from overloading, excessive torque strain, and the like.

A further object of the invention is to provide an adapter which may be readily installed and removed.

Another object of the invention is to provide an adapter which is simple in construction and which cannot easily become damaged.

An additional object of the invention is to provide an adapter which may be conventionally stored and carried in the vehicle, when not in use.

A still further object of the invention is to provide an adapter which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a fragmentary cross sectional view, showing the hub and the wheel shaft, and illustrating the invention in situ thereon;

Figure 2 is an end view of the invention per se, the same being taken substantially in the direction of the arrow 2 in Figure 1, and Figure 3 is a fragmentary plan view of an annular spacer used in the invention.

Like characters of reference are used to designate like parts in the specification and throughout the several views.

Referring now to the accompanying drawings in detail, the invention embodies in its construction an adapter designated generally by the reference character 5, the same consisting of a substantially tubular body 6, provided at one end thereof with an out-turned marginal rim 7.

The rim 7 is formed with a plurality of apertures 8, these being spaced in accordance with and being adapted to receive the wheel studs 9, such as are usually provided on the hub 10, for the purpose of securing the wheel 11 thereto.

If necessary, an annular spacer 12 is positioned between the wheel and the adjacent face of the rim 7, as will be clearly apparent from the accompanying drawings. The spacer 12 is, of course, formed with further apertures 13, adapted to receive the studs 9, the purpose of the spacer being hereinafter more fully explained.

The remaining end of the adapter body 6 is provided with an inturned annular rim 14, and a plurality of lugs 15 are welded or otherwise similarly secured, to the inner surface of the rim 14. The lugs 15 are spaced in such relationship, as to engage the apertures 16 provided in the flange 17 of the axle shaft 18. This will be hereinafter more fully described.

A diametrically extending strap 19 is welded to the outer surface of the rim 14, this strap being provided substantially in the center thereof with a screw threaded bore 20, adapted to receive an adjusting screw 21.

In the event that the hub 10 becomes damaged, or the bolts 22 which normally secure the flange 17 to the hub become sheared, the adapter 5 may be applied for emergency purposes, as shown in Figure 1. The rim 7 of the adapter is secured to the hub 10 and the associated wheel 11 by means of the studs 9, as has already been set forth. Simultaneously, the lugs 15 are engaged with the apertures 16 in the flange 17, whereupon the screw 21 may be tightened against the flange, in order to eliminate undue play. It will be noted that in this manner, the adapter 5 will constitute what may be referred to as an auxiliary hub, by directly connecting the flange 17 of the shaft 18 with the wheel 11.

The purpose of the spacer 12 is to facilitate the use of the adapter on hubs having different "depths" or distances from the axle flange to the wheel face.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a wheel mounting structure including an axle shaft terminating at the outer end thereof in a bolting flange formed with a plurality of apertures, a hub, a wheel, and a plurality of studs securing said wheel to said hub, an emergency hub adapter comprising a tubular body, an inturned rim at one end and an out-turned rim at the remaining end of said body, said out-turned rim being secured to said hub by said studs, a plurality of lugs provided on said inturned rim and engaging said apertures, and a clamping screw provided on said body, said clamping screw being engageable with the outer end of said shaft.

FRANK B. MARTIN, JR.

REFERENCES CITED

The following references are of record in the file of this patent:

UNITED STATES PATENTS

| Number | Name | Date |
|---|---|---|
| 1,412,058 | Johnson | Apr. 11, 1922 |
| 2,398,349 | Ash | Apr. 16, 1946 |